(12) United States Patent　　(10) Patent No.:　US 12,647,669 B2

Mudruk et al.　　(45) Date of Patent:　Jun. 2, 2026

(54) SURVEILLANCE CAMERA FOR APPLYING FACTORY DEFAULT SETTINGS FROM AN UNPOWERED STATE AND METHOD THEREOF

(71) Applicant: Robert Bosch GmbH, Stuttgart (DE)

(72) Inventors: Maksym Mudruk, Ovar (PT); Bruno Santos, Ovar (PT); Guilherme Goncalves, Ovar (PT); Joao Duarte, Ovar (PT); Pedro Miguel Duarte Cruz, Santa Maria da Feira (PT); Ricardo Costa, Ovar (PT); Tiago Campos, Ovar (PT); Andre Miranda, Ovar (PT); Andrea Cannizzaro, Serzedo Vila Nova de Gaia (PT); Samuel Barrezueta, Ovar (PT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/040,035

(22) Filed: Jan. 29, 2025

(65) Prior Publication Data

US 2025/0260890 A1　Aug. 14, 2025

(30) Foreign Application Priority Data

Feb. 8, 2024　(EP) ..................................... 24156584

(51) Int. Cl.
　*H04N 23/617*　(2023.01)
　*H04N 23/65*　(2023.01)
　*H04N 23/667*　(2023.01)

(52) U.S. Cl.
　CPC ......... *H04N 23/617* (2023.01); *H04N 23/651* (2023.01); *H04N 23/667* (2023.01)

(58) Field of Classification Search
　CPC ... H04N 23/617; H04N 23/667; H04N 23/651
　See application file for complete search history.

(56) References Cited

U.S. PATENT DOCUMENTS

| | | | |
|---|---|---|---|
| 7,372,645 B2 | 5/2008 | Van Schaik et al. | |
| 9,593,843 B2 * | 3/2017 | McRory | H04N 23/57 |
| 12,294,809 B1 * | 5/2025 | Cao | H04N 5/91 |
| 2011/0063449 A1 * | 3/2011 | Lee | H04N 7/185 |
| | | | 348/143 |
| 2014/0281151 A1 | 9/2014 | Yu et al. | |
| 2015/0125124 A1 | 5/2015 | Dozier et al. | |
| 2017/0322482 A1 | 11/2017 | Axelsson | |

* cited by examiner

*Primary Examiner* — Mishawn N. Hunter
(74) *Attorney, Agent, or Firm* — Michael Best & Friedrich LLP

(57)　　ABSTRACT

Surveillance camera comprising a camera base and a camera module the camera module comprising a reset button and a camera having an image capture sensor, wherein said camera base comprises a power-over-network module for data communication and power supply of the camera module, wherein said power-over-network module comprises a data network connection configured for receiving power over a data network, wherein the camera module further comprises a reset circuit comprising a self-powered power supply for the reset circuit and a non-volatile memory for storing a reboot flag. Respective method for operating thereof.

12 Claims, 6 Drawing Sheets

[PRIOR ART]

SURVEILLANCE CAMERA FOR APPLYING FACTORY DEFAULT SETTINGS FROM AN UNPOWERED STATE AND METHOD THEREOF

BACKGROUND

The present disclosure relates to a surveillance camera configured for applying factory default settings, i.e. reset, from an unpowered state and an operation method thereof for applying factory default settings, i.e. reset, to said camera from an unpowered state.

Prior art surveillance cameras require a mechanism for resetting the camera to factory default settings.

Document U.S. Pat. No. 7,372,645B2 discloses an observation device includes a housing and an optical lens having a field of view. The housing includes an outer dome having at least one transparent portion and an inner dome. The optical lens is accommodated within the housing. The outer dome is transparent in the field of view of the lens and is configured to protect the lens. The observation device is resistant to impact by an object with a maximum impact energy of a first magnitude. A like observation device, but lacking an inner dome, is resistant to impact by the object with a maximum impact energy of a second magnitude. The ratio between the first magnitude and the second magnitude is at least 1.1.

Document US20170322482A1 discloses a dome for a monitoring camera system comprises several monitoring cameras. The dome is formed from a transparent material, and has a toroidal shape with a rotational symmetry along a rotational angle around a first axis of symmetry. An outer segment of the dome, in section, has a shape further defined by a second axis of symmetry arranged at a first radius from the first axis of symmetry and is orthogonal to the first axis. The outer segment has a curvature following a second radius over an angle around the second axis of symmetry.

These facts are disclosed in order to illustrate the technical problem addressed by the present disclosure.

SUMMARY

This invention details the methodology and apparatus to perform unpowered factory default of surveillance camera, which allows the customer to perform a system reset while the camera is unmounted from the installation point, providing a fantastic user experience. It represents the better option for the customer to make factory default even when the camera is fully unpowered. The Apparatus demonstrate low power consumption to guarantee about 1.5 hours of functioning unpowered.

As shown in FIG. 1, conducting the camera factory reset usually requires following multiple steps:

Remove the camera module from the camera base.

Unscrew and remove the installer panel from the camera base.

Attach the installer PCBA to the camera module.

Attach Ethernet PoE cable (and aux power, if necessary)

Reset the camera via the reset button (press the reset button for 8-15 seconds till led start blinking)

Wait for the camera reboot

Reverse the process to mount the camera back to the initial installation position.

New solutions need to comply with the following requirements:

Improve UX—eliminate the need for an installer PCBA as a spare "tool" or disassemble it from the IP Box to execute the system reset.

Keep backward compatibility with the usual procedure (using spare installer PCBA)

Further particular and preferred aspects are set out in the accompanying disclosure. Features of the dependent claims may be combined with features of the independent claims as appropriate, and in combinations with described embodiments other than those explicitly set out in the disclosure.

Where elements are described as being connected or connectable, they may be directly connected. Where elements are described as being coupled or coupleable, they may be linked by one or more intervening or interposing elements.

It is disclosed a surveillance camera comprising preferably a camera base and a camera module detachable from said camera base, the camera module comprising a reset button and a camera having an image capture sensor, wherein preferably said camera base comprises a power-over-network module for data communication and power supply of the camera module, wherein said power-over-network module comprises a data network connection configured for receiving power over a data network, wherein the camera module further comprises a reset circuit comprising a self-powered power supply for the reset circuit and a non-volatile memory for storing a reboot flag, the reset circuit being arranged for: remaining at an unpowered sleep status until power is detected at the camera module; if a press of the reset button is detected, setting the reboot flag; when power is detected at the camera module, checking if the reboot flag is set and if the reboot flag is set, outputting a reset signal to the camera, waiting for the camera to reboot, resetting the reboot flag, and remaining at a powered sleep status while power is detected at the camera module; and going back to the unpowered sleep status when power is no longer detected at the camera module.

In an embodiment, the reset circuit is further arranged to, when setting the reboot flag, blink a light indicator.

In an embodiment, the reset circuit is further arranged to, when setting the reboot flag, blink the light indicator a predetermined number of times.

In an embodiment, the light indicator is a LED.

In an embodiment, the reset circuit is further arranged to, if a press of the reset button is detected while in the powered sleep status, outputting the reset signal to the camera, waiting for the camera to reboot, resetting the reboot flag, and remaining at the powered sleep status while power is detected at the camera module.

In an embodiment, the reset circuit is further arranged to detect a press of the reset button only when the reset button is pressed continuously for a predetermined period of time or the reset button is pressed repeatedly a predetermined number of times.

In an embodiment, the reset circuit comprises a connection to the reset signal of the camera.

In an embodiment, the reset circuit comprises a connection to the reset button signal connection between the camera and the reset button.

In an embodiment, the camera comprises an optical arrangement for said image capture sensor.

It is also disclosed a computer-implemented method for operating a surveillance camera, said surveillance camera comprising preferably a camera base and a camera module detachable from said camera base, the camera module comprising a reset button and a camera having an image capture sensor, wherein preferably said camera base comprises a power-over-network module for data communication and power supply of the camera module and an electronic data processor, said method comprising the steps of: remaining at an unpowered sleep status until power is detected at the camera module; if a press of the reset button is detected, setting the reboot flag; when power is detected at the camera module, checking if the reboot flag is set and if the reboot flag is set, outputting a reset signal to the camera, waiting for the camera to reboot, resetting the reboot flag, and remaining at a powered sleep status while power is detected at the camera module; and going back to the unpowered sleep status when power is no longer detected at the camera module.

In an embodiment, the method further comprises the steps of: if a press of the reset button is detected while in the powered sleep status, outputting the reset signal to the camera, waiting for the camera to reboot, resetting the reboot flag, and remaining at the powered sleep status while power is detected at the camera module.

In an embodiment, the method further comprises detecting a press of the reset button only when the reset button is pressed continuously for a predetermined period of time or the reset button is pressed repeatedly a predetermined number of times.

BRIEF DESCRIPTION OF THE DRAWINGS

The following figures provide preferred embodiments for illustrating the disclosure and should not be seen as limiting the scope of invention.

DETAILED DESCRIPTION

It is disclosed a surveillance camera comprising a camera base and a camera module detachable from said camera base, the camera module comprising a reset button and a camera having an image capture sensor, wherein said camera base comprises a power-over-network module for data communication and power supply of the camera module and additional external power supply, both operating in seamless transition with Power-over-Ethernet priority, wherein said power-over-network module comprises a data network connection configured for receiving power over a data network, wherein the camera module further comprises a reset circuit comprising a self-powered power supply for the reset circuit and a non-volatile memory for storing a reboot flag, the reset circuit being arranged for: remaining at an unpowered sleep status until power is detected at the camera module; if a press of the reset button is detected, setting the reboot flag; when power is detected at the camera module, checking if the reboot flag is set and if the reboot flag is set, outputting a reset signal to the camera, waiting for the camera to reboot, resetting the reboot flag, and remaining at a powered sleep status while power is detected at the camera module; and going back to the unpowered sleep status when power is no longer detected at the camera module.

Figure 1B:
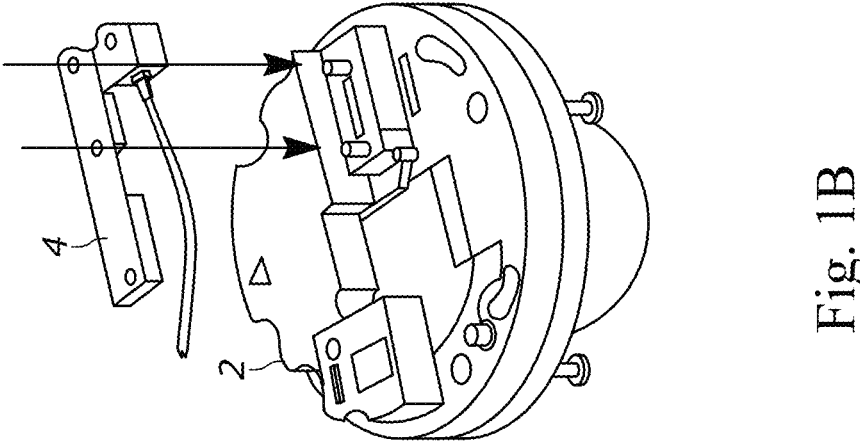
FIG. 1B: Schematic representation of a prior art embodiment of a surveillance camera comprising a camera module which is detachable from the power delivery camera base, during powered reset using temporary power delivery.
Figure 1A:
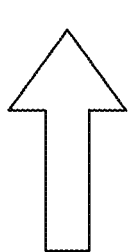
FIG. 1A: Schematic representation of a prior art embodiment of a surveillance camera comprising a power delivery camera base.
Figure 1A:
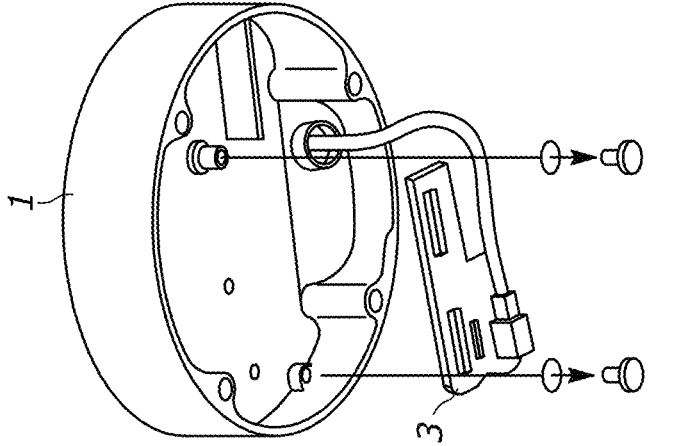
Figure 2A:
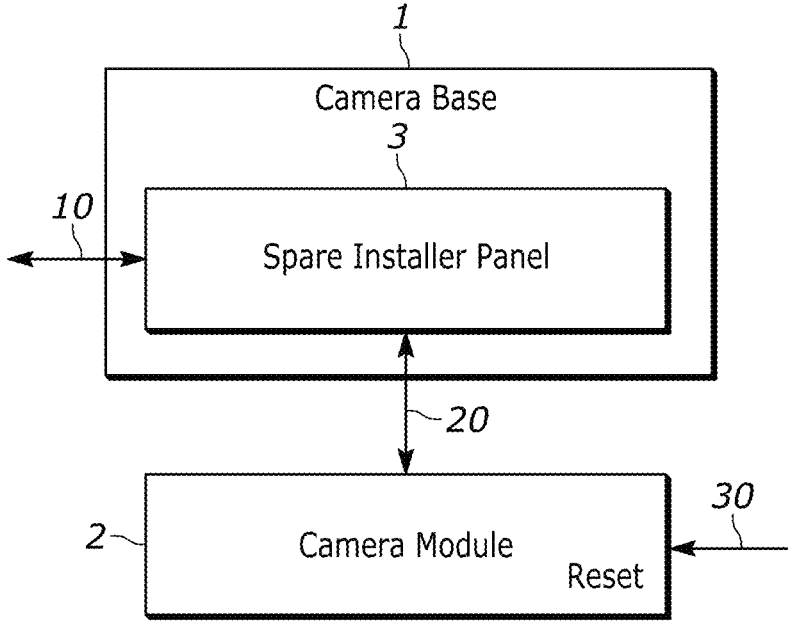
FIG. 2A: Schematic representation of a prior art embodiment of a surveillance camera comprising a camera module which is detachable from a power delivery camera base.
Figures 2B, 3:
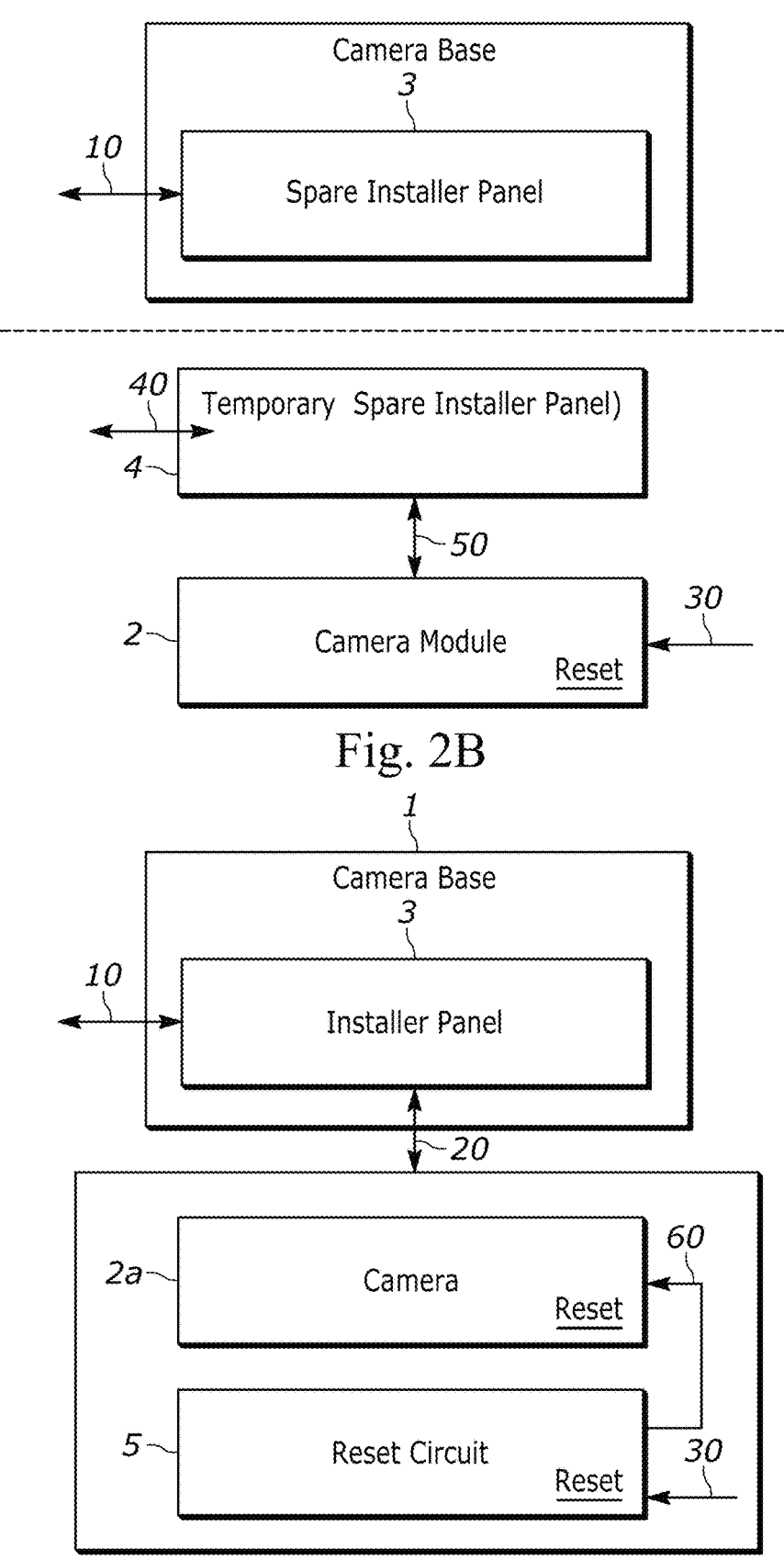
FIG. 2B: Schematic representation of a prior art embodiment of a surveillance camera comprising a camera module which is detachable from a power delivery camera base, during powered reset using temporary power delivery.
FIG. 3: Schematic representation of an embodiment of the disclosed surveillance camera comprising a camera module which is detachable from a power delivery camera base, comprising a reset circuit according to the disclosure, for powered reset without power delivery from the camera base.
Figure 4:
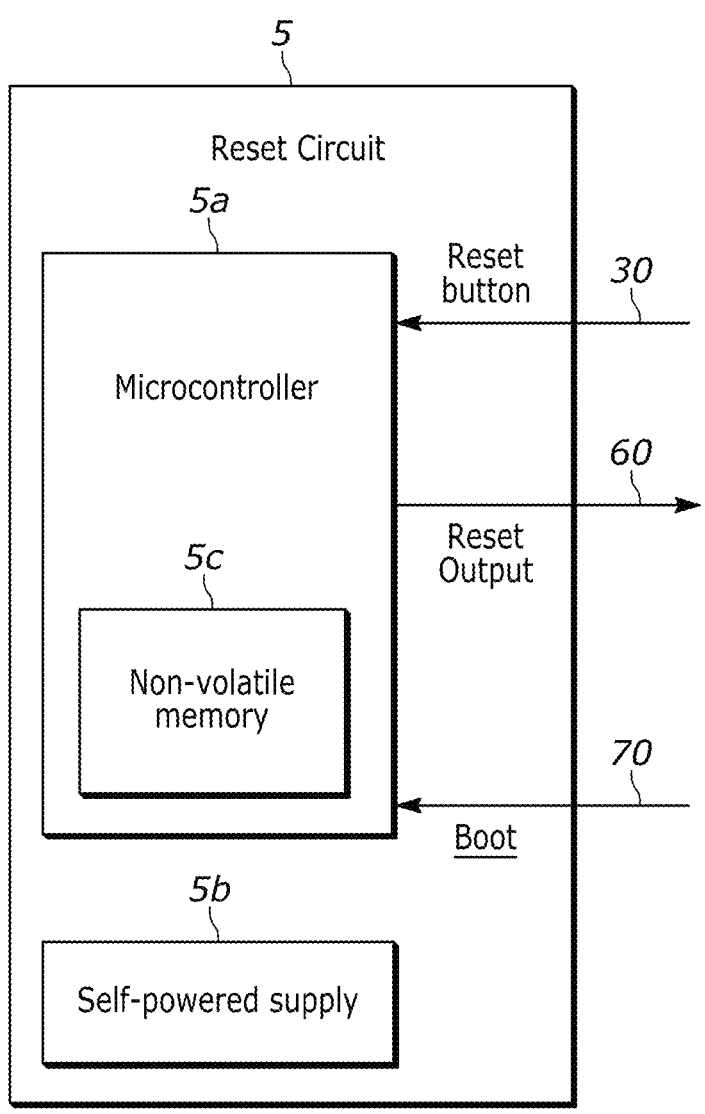
FIG. 4: Schematic representation of the reset circuit according to the disclosure, for powered reset without power delivery from the camera base.

The reset circuit, as shown in FIG. 4, contains the microcontroller, which is powered by additional energy storage (e.g. supercapacitor) on a carrier board, for example; it allows to accept the Reset command even if the camera is disconnected from the camera base or installer panel and not powered for some time (for example, 90 minutes). After pressing the reset button for longer than for example 10 seconds (interval to prevent system reset by accidental/unwanted press of the reset button), the microcontroller in the reset circuit stores this reset flag in internal nonvolatile memory and initiates the reset procedure for the System SoC when the camera becomes powered.

Figure 5:
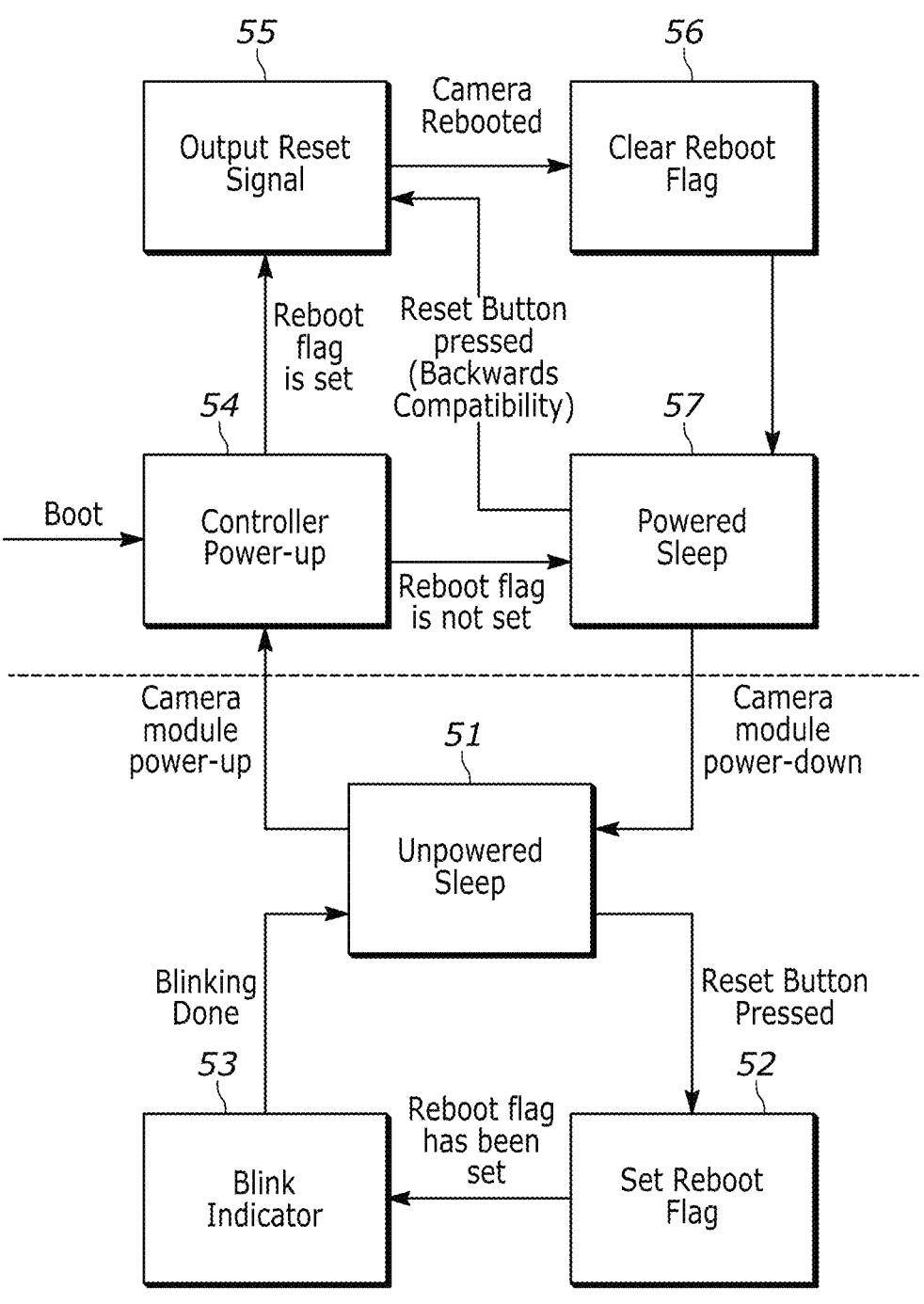
FIG. 5: Schematic representation of a state diagram of the reset circuit.
Figure 6:
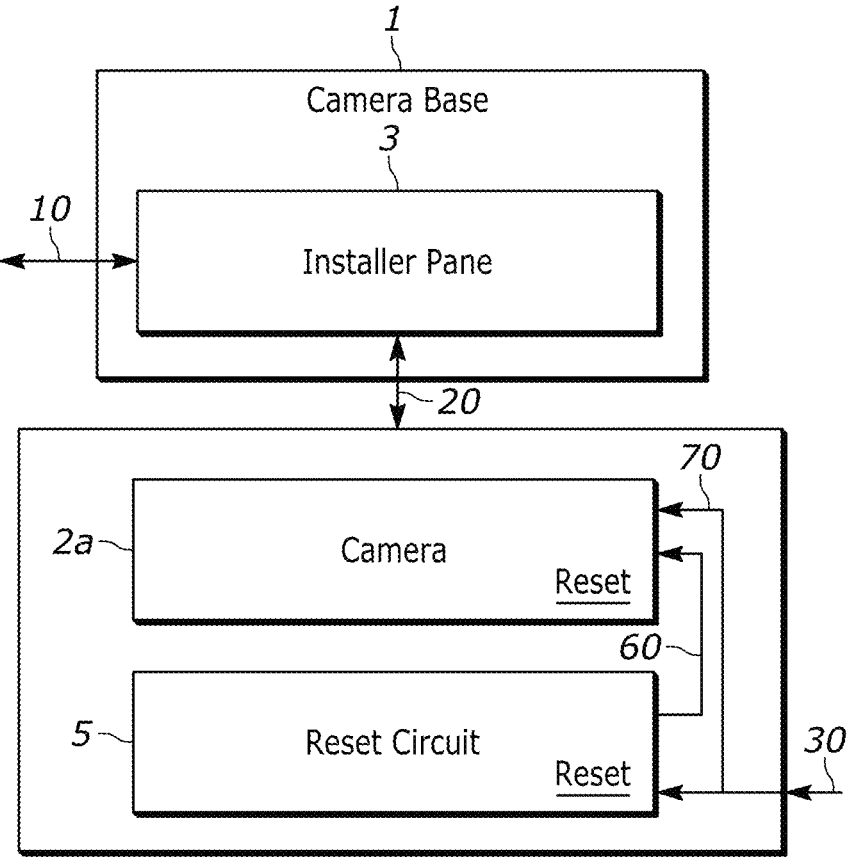
FIG. 6: Schematic representation of an embodiment of the disclosed surveillance camera comprising a camera module which is detachable from a power delivery camera base, comprising a reset circuit according to the disclosure, for powered reset without power delivery from the camera base, where the reset button signal is connected to both the camera and the reset circuit.

An important feature is a sleep mode of the microcontroller, which allows it to be powered by the capacitor, for example, for around 90 minutes. For this reason, the microcontroller will be most of the time in sleep mode until any input detects a rise/fall edge. The microcontroller has a non-volatile variable inside, a REBOOT variable, which is used to store the reboot button state. The state machine can be seen in the FIG. 5. The following states are described in more detail.

State 54—Controller Power-up—this state is entered when the camera is powered. If a reboot was detected by the microcontroller, it will drive low the reset output in state 55—Output Reset Signal—until the camera is rebooted.

State 56—Clear Reboot Flag—at this state, the internal reboot flag is cleared, meaning if the microcontroller enters in this state again, it will not drive the reset output as before, unless it is powered off and the reset button is pressed again.

State 57—Powered Sleep—in this state, the camera is expected to be asleep with the camera turned ON, just waiting for any transition on a Power Sense input. When a falling edge is detected on Power Sense input, which means camera shutdown, and it will lose power and the microcontroller will move into the Unpowered Sleep.

State 51—Unpowered Sleep—this is a core state, which means the camera is being powered by the self-powered supply and it should be paying attention to the Reset button. It stays in sleep until it sees any change in the Reset button or in the power sense input; if the power sense goes high, it goes to the Powered Sleep state and then goes to sleep again. If the Reset button is pressed, it drives the pin low, entering state 52 set reboot flag state. Optionally, a counting state may be used. During this state, if at any moment the button is released, it will jump to a Reset Internal Counter state, which resets the time counter. If the button is pressed during more than 10 seconds, it will trigger the led by jumping into the state 52 set reboot flag state. The time the button is being pressed is being measured in this state, if at any moment the button is released, the internal counter is reset, while if the button is pressed continuously for more than 10 seconds it will count as a real system reset request.

State 52—set reboot flag state—In this state, the internal flag, reboot, is set high and optionally a reset LED will blink a number of times. After that, it will go to the unpowered sleep.

The term "comprising" whenever used in this document is intended to indicate the presence of stated features, integers, steps, components, but not to preclude the presence or addition of one or more other features, integers, steps, components or groups thereof.

Flow diagrams of particular embodiments of the presently disclosed methods are depicted in figures. The flow diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof. The above-described embodiments are combinable. The following claims further set out particular embodiments of the disclosure.

The invention claimed is:

1. A surveillance camera comprising a camera module (2), the camera module (2) comprising a reset button (30) and a camera (2a) having an image capture sensor, wherein the camera module (2) further comprises a reset circuit (5) comprising a self-powered power supply (5b) for the reset circuit (5) and a non-volatile memory (5c) for storing a reboot flag, the reset circuit (5) configured to:

remain at an unpowered sleep status (51) until power is detected at the camera module (2);

in response to detecting a press of the reset button (30), set the reboot flag (52);

in response to detecting power (54) at the camera module (2), check whether the reboot flag is set and when the reboot flag is set, output (55) a reset signal (60) to the camera (2a), wait for the camera (2a) to reboot, reset (56) the reboot flag, and remain at a powered sleep status (57) while power is detected at the camera module (2); and going back to the unpowered sleep status (51) when power is no longer detected at the camera module (2).

2. The surveillance camera according to claim 1 wherein the reset circuit (5) is further configured to, when setting the reboot flag (52), blink a light indicator (53).

3. The surveillance camera according to claim 2 wherein the reset circuit (5) is further configured to, when setting the reboot flag (52), blink the light indicator (53) a predetermined number of times.

4. The surveillance camera according to claim 3 wherein the light indicator (53) is a LED.

5. The surveillance camera according to claim 1 wherein the reset circuit (5) is further configured to, in response to detecting a press of the reset button while in the powered sleep status (57), output (55) the reset signal (60) to the camera (2a), wait for the camera (2a) to reboot, reset (56) the reboot flag, and remain at the powered sleep status (57) while power is detected at the camera module (2).

6. The surveillance camera according to claim 1 wherein the reset circuit (5) is further configured to detect a press of the reset button (30) only when the reset button is pressed continuously for a predetermined period of time or the reset button is pressed repeatedly a predetermined number of times.

7. The surveillance camera according to claim 1 wherein the reset circuit (5) comprises a connection to the reset signal (60) of the camera (2a).

8. The surveillance camera according to claim 1 wherein the reset circuit (5) comprises a connection to the reset button signal (70) connection between the camera (2a) and the reset button (30).

9. The surveillance camera according to claim 1 wherein the camera (2a) comprises an optical arrangement for said image capture sensor.

10. A computer-implemented method for operating a surveillance camera, said surveillance camera comprising a camera module (2), the camera module (2) comprising a reset button (30) and a camera (2a) having an image capture sensor, said method comprising the steps of:

remaining at an unpowered sleep status (51) until power is detected at the camera module (2);

in response to detecting a press of the reset button (30), setting the reboot flag (52);

when power is detected (54) at the camera module (2), checking whether the reboot flag is set and when the reboot flag is set, outputting (55) a reset signal (60) to the camera (2a), waiting for the camera (2a) to reboot, resetting (56) the reboot flag, and remaining at a powered sleep status (57) while power is detected at the camera module (2); and going back to the unpowered sleep status (51) when power is no longer detected at the camera module (2).

11. The computer-implemented method according to claim 10 wherein the method further comprises the steps of: when a press of the reset button is detected while in the powered sleep status (57), outputting (55) the reset signal (60) to the camera (2a), waiting for the camera (2a) to reboot, resetting (56) the reboot flag, and remaining at the powered sleep status (57) while power is detected at the camera module (2).

12. The computer-implemented method according to claim 11 wherein the method further comprises detecting a press of the reset button (30) only when the reset button is pressed continuously for a predetermined period of time or the reset button is pressed repeatedly a predetermined number of times.

\* \* \* \* \*